(12) United States Patent
Rail

(10) Patent No.: US 7,100,197 B2
(45) Date of Patent: Aug. 29, 2006

(54) NETWORK USER AUTHENTICATION SYSTEM AND METHOD

(75) Inventor: Peter D. Rail, Plano, TX (US)

(73) Assignee: Electronic Data Systems Corporation, Plano, TX (US)

( * ) Notice: Subject to any disclaimer, the term of this patent is extended or adjusted under 35 U.S.C. 154(b) by 705 days.

(21) Appl. No.: 10/013,609

(22) Filed: Dec. 10, 2001

(65) Prior Publication Data

US 2003/0110399 A1 Jun. 12, 2003

(51) Int. Cl.
*H04L 9/32* (2006.01)

(52) U.S. Cl. .................... 726/3; 713/183; 709/225

(58) Field of Classification Search ........ 713/200–202, 713/156, 182–183, 178; 711/164; 714/758; 726/3–4; 709/223–225
See application file for complete search history.

(56) References Cited

U.S. PATENT DOCUMENTS 6,353,886 B1 * 3/2002 Howard et al. ............. 713/156
6,389,539 B1 * 5/2002 Hamilton et al. ........... 713/200
6,421,768 B1 * 7/2002 Purpura ...................... 711/164
6,510,513 B1 * 1/2003 Danieli ....................... 713/156

FOREIGN PATENT DOCUMENTS

WO WO 01/72009 A2 9/2001

OTHER PUBLICATIONS

Article: "SiteMinder 4.6: How it Works" © 1999-2001, Netegrity, Inc.—3 pages.
Notification of Transmittal of International Preliminary Examination Report on International application No. PCT/US02/38938 filed Dec. 6, 2002; (4 pages).
Notification of Transmittal of The International Search Report on International application No. PCT/US02/38938 filed Dec. 6, 2002, citing the PCT reference above, (6 pages).

* cited by examiner

*Primary Examiner*—Kim Vu
*Assistant Examiner*—T. B. Truong
(74) *Attorney, Agent, or Firm*—Baker Botts L.L.P.

(57) ABSTRACT

According to one embodiment of the invention, a network user authentication method includes receiving a network identification and a password associated with a user, validating the network identification and the password, generating a passkey for the user, and sending the passkey to the user for temporary storage in a computer of the user.

30 Claims, 4 Drawing Sheets

NETWORK USER AUTHENTICATION SYSTEM AND METHOD

TECHNICAL FIELD OF THE INVENTION

The present invention relates generally to the field of computer networks and, more particularly, to an network user authentication system and method.

BACKGROUND OF THE INVENTION

Because of an increasing use of computer networks, corporations, especially large corporations, have a myriad of information in electronic form. This electronic information is typically stored on multiple servers that are distributed globally. Much of this stored information is sensitive or confidential. Therefore, corporations take computer security very seriously. This is why most corporate information is transmitted over secure telecommunication channels.

The use of secure channels to transmit information from a server to an employee's computer often uses processor-intensive encryption. This approach is costly and unnecessary since the majority of company information is not sensitive. The extra processor cycles required for encryption may cripple a server under heavy user load.

As another measure of security, most corporations require that employees be authenticated when accessing a particular server. Typically, this authentication requires the user to enter a network identification and password so that they may access the desired information on that server. However, if the employee desires information that is stored on another server, the employee will have to re-enter his or her network identification and password to access that information on that server. This re-entering of the network identification and password each time a different server is accessed is burdensome and oftentimes very frustrating to an employee.

SUMMARY OF THE INVENTION

According to one embodiment of the invention, a network user authentication method includes receiving a network identification and a password associated with a user, validating the network identification and the password, generating a passkey for the user, and sending the passkey to the user for temporary storage in a computer of the user.

According to another embodiment of the invention, a network user authentication method includes receiving a request from a user, retrieving a passkey in a memory of a computer of the user, validating the passkey, and generating a response to the request. The passkey includes a network identification, an IP address, a timestamp, a cyclic redundancy check, and a length.

Embodiments of the invention provide a number of technical advantages. Embodiments of the invention may include all, some, or none of these advantages. A network implemented with one embodiment of the present invention allows an employee to avoid having to enter his or her network identification and/or password each time he or she desires to access another server. This improves the network user experience while maintaining or even enhancing authentication rules and network security. Since a network identification and/or password does not have to be entered each time a new server is entered, each server does not have to have a user database, thereby allowing a centralized user database. In addition, a substantial amount of system resources is freed-up because of the elimination of unnecessary processor-intensive encryption. This allows a single server to accommodate significantly more authenticated users.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which.

DETAILED DESCRIPTION OF EMBODIMENTS OF THE INVENTION

Embodiments of the present invention and their advantages are best understood by referring now to FIGS. 1–4 of the drawings, in which like numerals refer to like parts.

Figure 1:
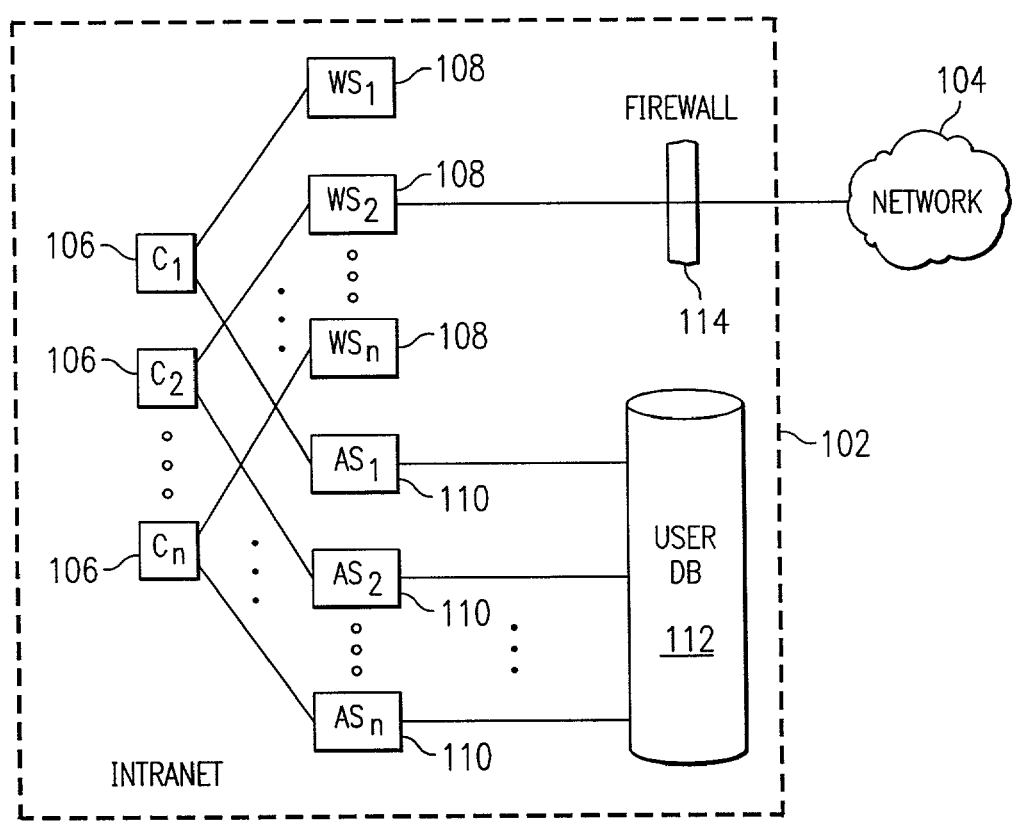
FIG. 1 is a block diagram illustrating a network user authentication system in accordance with one embodiment of the present invention.
Figure 2:
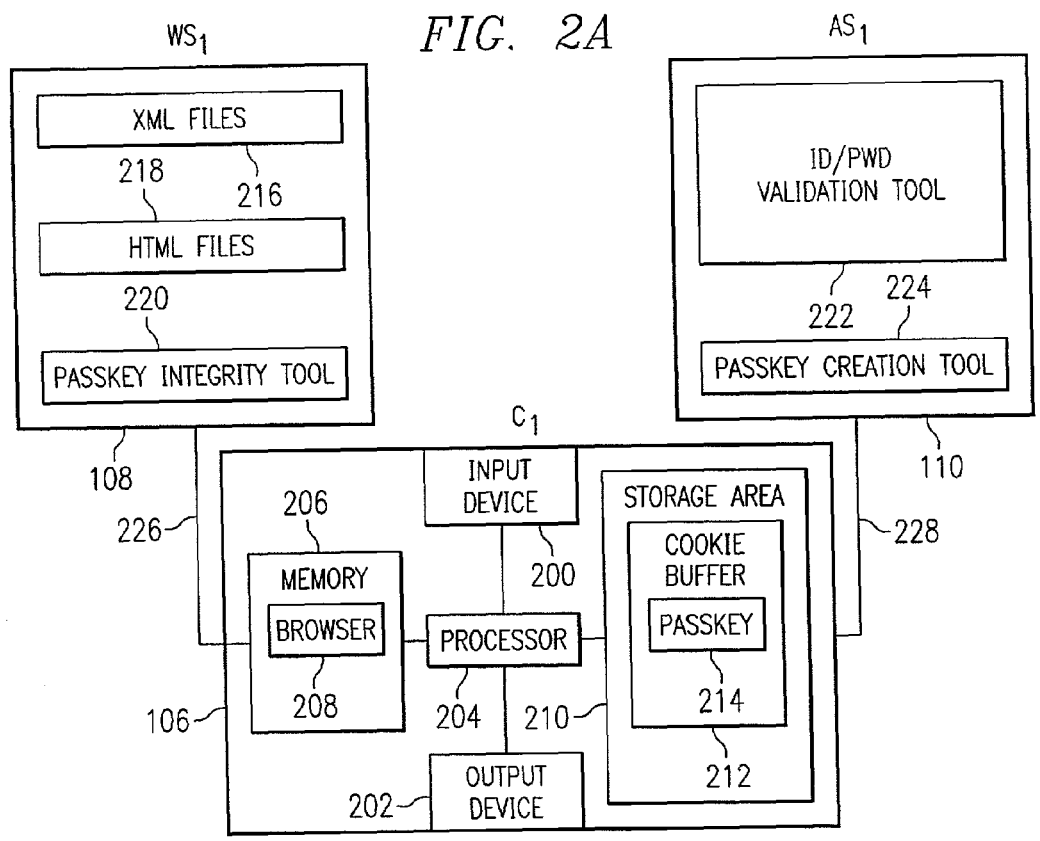
FIG. 2A is a block diagram illustrating a client, a web server, and an authentication server in accordance with one embodiment of the present invention.
FIG. 2B is a chart illustrating one embodiment of a passkey in accordance with the teachings of the present invention.

FIG. 1 is a block diagram illustrating a network user authentication system 100 in accordance with one embodiment of the present invention. Network user authentication system 100 includes an intranet 102 coupled to a network 104, which may be any suitable network, such as the Internet, an extranet, other intranets, or other suitable networks or multiple networks. Intranet 102 is any suitable private network of a corporation that may be a local area network, a wide area network, a global computing network, or other suitable private network. In the illustrated embodiment, intranet 102 includes a plurality of clients 106, a plurality of web servers 108, a plurality of authentication servers 110, a user database 112, and a firewall 114. Intranet 102 may have less components, more components, or different components than that shown in FIG. 1.

FIG. 2A is a block diagram illustrating a single client 106, a single web server 108, and a single authentication server 110. Only one of each is shown for clarity of description purposes.

Client 106 is any suitable computing device and/or software that functions to request and receive information. In one embodiment, client 106 is a personal computer ("PC"); however, client 106 may be any suitable type of computing device that can execute browser software. Client 106 is typically associated with a user, such as an employee of a corporation. As illustrated in FIG. 2A, client 106 includes an input device 200, an output device 202, a processor 204, a memory 206 storing a browser 208, and a storage area 210 having a cookie buffer 212 storing a passkey 214.

Input device 200 is associated with client 106 for the purpose of inputting commands into client 106. In one embodiment, input device 200 is a keyboard; however, input device 200 may take other suitable forms, such as a mouse and a stylus. Output device 202 may be any suitable visual display unit, such as a liquid crystal display ("LCD") or cathode ray tube ("CRT") display. Output device 202 may also be coupled to other suitable devices such as a printer (not shown) for the purpose of printing any desired information.

Processor 204 comprises any suitable type of processing unit that executes logic. One of the functions of processor 204 is to execute browser 208 stored in memory 206. Processor 204 may perform other suitable functions.

Memory 206 and storage area 210 may comprise files, stacks, databases, or other suitable organizations of volatile or non-volatile memory. Memory 206 and storage area 210 may be random-access memory, read-only memory, CD-ROM, removable memory devices, or any other suitable devices that allow storage and/or retrieval of data. Memory 206 and storage area 210 are interchangeable and may perform the same functions.

Browser 208 is any suitable browser software, such as Netscape or Internet Explorer, that utilizes hypertext transfer protocol ("http"), hypertext transfer protocol secure ("https"), file transfer protocol ("ftp"), or other suitable protocol to allow a user to communicate with web server 108, authentication server 110, or other suitable server.

Cookie buffer 212 is any suitable buffer contained in storage area 210 that temporarily stores cookies. A cookie is a piece of information that a server may send to a browser during a transaction. From then on, the browser returns this cookie to that server each time the browser connects to the server. The server generally uses the cookie to maintain a user session that spans several web page interactions. Cookie buffer 212 may also be temporarily stored in other suitable locations on client 106, such as the directory structure of browser 208.

Passkey 214, according to the teachings of the present invention, allows a user of client 106 to access any web server 108 that the user desires without having to re-enter their network identification and password each time the user accesses a different web server 108. According to one embodiment, passkey 214 is essentially a non-persistent cookie that is temporarily stored in cookie buffer 212 when created by authentication server 110, as described more fully below. Non-persistent in this context means that passkey 214 is only stored during a time that browser 208 is opened until browser 208 is closed. One configuration of passkey 214 is described below in conjunction with FIG. 2B.

Web server 108 is a computer system or other suitable hardware and/or software that stores information, such as extensible mark-up language ("XML") files 216, hypertext mark-up language ("HTML") files 218, or other information in other suitable formats. Web server 108 may also function to execute software applications, such as passkey integrity tool 220. Web server 108 may also have other suitable functionalities. Additional details of the functions of web server 108 are described more fully below in conjunction with FIGS. 3 and 4. Web server 108 couples to client 106 via any suitable link 226. Link 226 may be any suitable wireline or wireless link that is operable to transmit information via any suitable data communications protocol, such as http, https, and ftp.

Authentication server 110 is a computer system or other suitable hardware and/or software that is operable to execute one or more software applications, such as an ID and password validation tool 222 and a passkey creation tool 224. Authentication server 110 also functions to access database 112 for the purpose of executing ID and password validation tool 222. Authentication server 110 may have other suitable functions. Additional details of authentication server 110 are described below in conjunction with FIGS. 3 and 4. Authentication server 110 couples to client 106 via any suitable link 228. Link 228 may be any suitable wireline or wireless link that is operable to transmit information via any suitable data communications protocol, such as http, https, and ftp.

Referring back to FIG. 1, user database 112 is any suitable storage medium that stores information about employees of a corporation. As illustrated, user database 112 is accessible by authentication servers 110 for the purpose of validating an employee's network identification and password, as described in more detail below. Firewall 114 is any suitable combination of hardware and/or software that limits the exposure of intranet 102 to an attack from outside intranet 102.

FIG. 2B is a chart illustrating one embodiment of passkey 214 in accordance with the teachings of the present invention. As described generally above, passkey 214 has a number of fields 501. These fields may include a length 500, a cyclic redundancy check ("CRC") 502, a network identification 504, and IP address 506, a time stamp 508, and/or any suitable combination thereof. Length 500 defines the number of characters in a string of data fields, such as a string made up of network identification 504, IP address 506, and time stamp 508. This data field string may also include CRC 502. CRC 502 verifies the integrity of passkey 214 by using any suitable self-checking method, such as an MD5 algorithm or a suitable hashing function. Network identification 504 identifies a particular user. IP address 506 identifies a particular client 106. Typically, a user is associated with only one IP address, that being the computer the user is logged in at during that particular session. Time stamp 508 indicates when passkey 214 is issued. Passkey 214 may include less, more, or different data fields.

Figure 3:
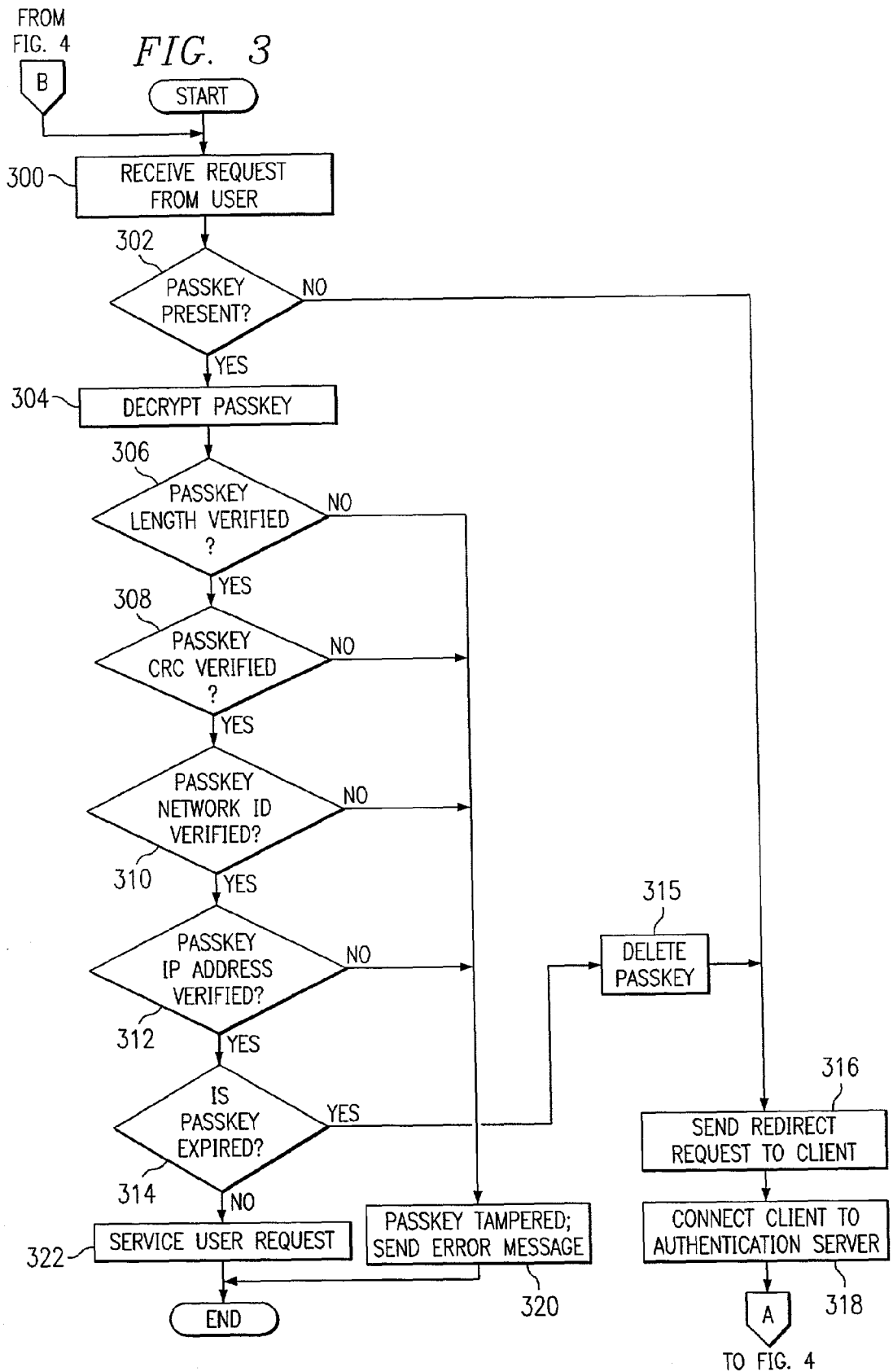
FIG. 3 is a flowchart illustrating various details of a passkey integrity tool in accordance with one embodiment of the present invention.

FIG. 3 is a flowchart illustrating various details of an operation of passkey integrity tool 220 according to one embodiment of the present invention. The method begins at step 300 where a request is received from a user. For example, a user on client 106 may desire a certain piece of information contained on web server 108. The user utilizes browser 208 to type in a specific uniform resource locator ("URL") so that he or she may access a particular file or other piece of information on a particular web server 108.

At step 302, passkey integrity tool 220 determines whether passkey 214 is present in cookie buffer 212 of client 106. If passkey 214 is not present, then the method continues at step 316, as outlined below. If passkey 212 is present, then the method continues to step 304. Passkey 214 is only present after creation by authentication server 110, as described fully below. At step 304, passkey integrity tool 220 decrypts passkey 214 using any suitable private encryption key.

Once passkey 214 is decrypted, then various data fields in passkey 214 may be verified. Data fields that make up passkey 214 are described above in conjunction with FIG. 2B. The verifications are described below in conjunction with steps 306 through 312.

At step 306, a determination is made whether length 500 of passkey 214 is verified. Generally, passkey integrity tool 220 determines whether length 500 has changed since being created by authentication server 110. If length 500 has changed, then the method continues as step 320, as outlined below. If length 500 has not changed, then the length 500 is verified and the method continues at step 308. At step 308, a determination is made whether CRC 502 is verified. Generally, passkey integrity tool determines whether CRC 502 has changed since it was created by authentication server 110. If CRC 502 has changed, then the method continues as step 320, as outlined below. If CRC 502 has not changed, then CRC 502 is verified and the method continues at step 310. At step 310, a determination is made whether network identification 504 of passkey 214 is verified. Generally, passkey integrity tool 108 determines whether network identification 504 has changed during the creation of passkey 214 by authentication server 110. If network identification 504 has changed, then the method continues at step 320, as outlined below. If network identification 504 has not changed, then it is verified and the method continues at step 312. At step 312, a determination is made whether IP address 506 is verified. Generally, passkey integrity tool 108 determines whether IP address 506 has changed since the creation of passkey 214 by authentication server 110. If IP address 506 has changed, then the method continues at step 320, as outlined below. If IP address 506 has not changed, then it is verified and the method continues at decisional step 314.

At decisional step 314, a determination is made whether passkey 214 is expired. Generally, passkey integrity tool 220 determines a time period that has elapsed since the creation of passkey 214 by utilizing time stamp 508 within passkey 214 and the current time. This time period is compared to an allowable time period that is stored on web server 108. If the time period is less than or equal to the allowable time period, then passkey 214 has not expired and the method continues at step 322 where the user's request is serviced. In other words, the information that the user desired, such as XML file 216 or HTML file 218, is sent to the user. If the time period is greater than the allowable time period, then the method continues at step 315.

At step 315, passkey 214 is deleted from cookie buffer 212 since it is expired. At step 316, a redirect request is sent to client 106. This redirect request essentially sends or directs client 106 to authentication server 110. Client 106 is then connected, at step 318, to authentication server 110. The method then continues as outlined in FIG. 4 below.

Figure 4:
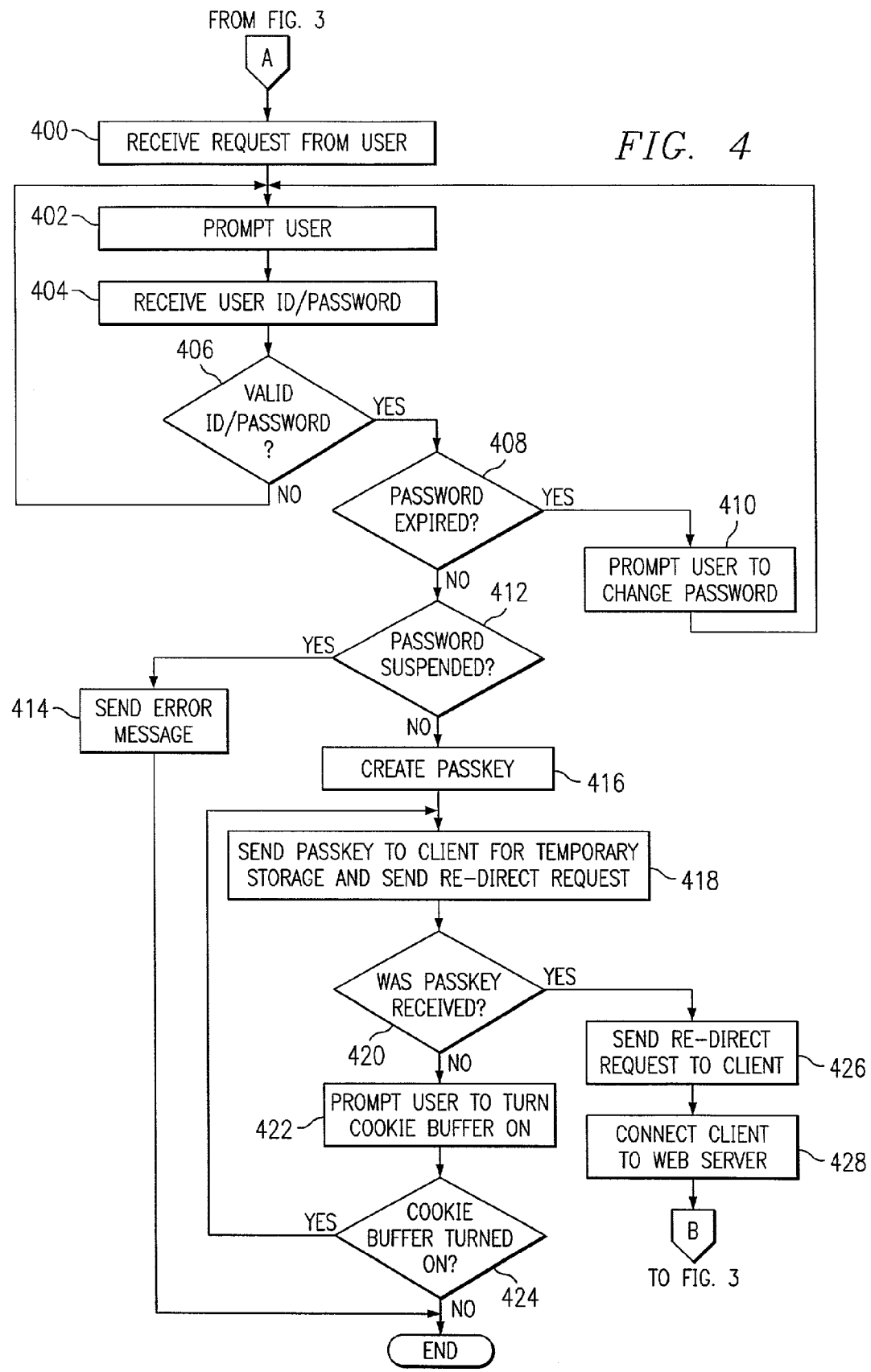
FIG. 4 is a flowchart illustrating various details of an identification and password validation tool and a passkey creation tool in accordance with embodiments of the present invention.

FIG. 4 is a flowchart illustrating various details of an operation of ID and password validation tool 222 and an operation of passkey creation tool 224 in accordance with embodiments of the present invention. At step 400, a request is received from a user. In one embodiment, this request is the same request that was received by web server 108 at step 300 above. When authentication server 110 receives the request, ID and password validation tool 222 prompts the user for the user's network identification and password at step 402. ID and password validation tool 222 receives the user's network identification and password at step 404. At step 406, a determination is made whether the network identification and password of the user is valid. In this step, ID and password validation tool 222 access user database 112 (FIG. 1) to validate the user's identification and password. If the network identification and/or password is not valid, the method continues at step 402 at the prompting step. The user is allowed a certain number of tries before an error message is sent to the user indicating that he or she will not be receiving a passkey because a valid identification and password has not been entered. If the network identification and password of the user is validated at step 406, then the method continues at step 408.

At step 408, a determination is made whether the password of the user is expired. Once again, ID and password validation tool 222 typically accesses user database 112 to determine whether or not the password is expired. If the password is expired, then the user is prompted to change his or her password at step 410 and the method continues as step 402, as outlined above. If the password is not expired, then the method continues at decisional step 412 where a determination is made whether the password is suspended. ID and password validation tool 222 once again accesses user database 112 to determine whether or not the password is suspended. If the password is suspended, then an error message is sent at step 414 to the user and the method ends. If the password is not suspended, then the method continues at step 416.

At step 416, passkey 214 is created. In one embodiment, passkey 214 is created as follows. Network identification 504, IP address 506, and time stamp 508 is temporarily stored in a buffer (not shown) as a string of data fields. Network identification 504 is known because it is input by the user and verified by ID and password validation tool 222. IP address 506 is known because it is unique to a particular client 106. Time stamp 508 is determined by authentication server 110 based on the current time. CRC 502 is then determined for the string of data fields using any suitable algorithm stored in authorization passkey creation tool 224. The string of data fields is appended with CRC 502 before length 500 is determined for the string of data fields. Length 500 is then appended to the string of data fields to create passkey 214. Other suitable methods of creating passkey 214 may be utilized. Length 500 may be determined on the string of data fields containing network identification 504, IP address 506, and time stamp 508. In other embodiments, length 500 is determined on a string of data fields containing network identification 504, IP address 506, time stamp 508, and CRC 502. Passkey creation tool 224 uses any suitable encryption technique to encrypt passkey 214. In one embodiment, an 80 bit encryption technique is utilized.

Once passkey 214 is created by passkey creation tool 224, the method continues at step 418 where passkey 214 is sent to client 106 for temporary storage. Also at step 418, a redirect request is sent to client 106 so that authentication server 110 may determine whether or not passkey 214 is stored in cookie buffer 212 of client 106. At step 420, a determination is made whether passkey 214 was received from client 106. If passkey 214 is not received, then the user is prompted, at step 422, to turn his or her cookie buffer 212 on (i.e., to activate it). At decisional step 424, a determination is made whether cookie buffer 212 is turned on. If cookie buffer 212 is not turned on, then the method ends. However, if cookie buffer 212 is turned on, then the method continues at step 418, as outlined above. If passkey 214 is received by authentication server 110 and step 420, then the method continues at step 426 where another redirect request is sent to client 106. This redirect request essentially directs client 106 back to web server 108. Client 106 is connected to web server 108 at step 428 and the method continues at step 300, as outlined in FIG. 3 above.

The method outlined in FIG. 3 above may be performed by any web server 108 in intranet 102. Accordingly, once passkey 214 is stored in cookie buffer 212 of client 106, then that particular user may access any particular web server 108 in accordance with the method as outlined above in FIG. 3. This allows a user to "jump" from web server 108 to web server 108 without having to reenter his or her network identification and password each time. This saves considerable time and frustration to the user. In addition, this frees up considerable processing power of different web servers 108 because a secure channel is not necessarily required when sending non-sensitive company information. The only secure channel that may be required is the channel that goes from client 106 to authentication server 110. In other embodiments, web server 108 sends sensitive information over a secure channel, but this depends on the type of information that is sent.

Although embodiments of the invention and their advantages are described in detail, a person skilled in the art could make various alterations, additions, and omissions without departing from the spirit and scope of the present invention as defined by the appended claims.

What is claimed is:

1. A network user authentication method, comprising:
   receiving a network identification and a password associated with a user;
   validating the network identification and the password;
   generating a passkey for the user that allows the user to access one or more web servers without having to enter the network identification and the password each time, the passkey comprising the network identification, an IP address, a timestamp, a cyclic redundancy check, and a length, generating the passkey for the user comprising:
      temporarily storing the network identification, the IP address, and the timestamp in a buffer as a string of data fields;
      determining the cyclic redundancy check for the string;
      appending the string with the determined cyclic redundancy check;
      determining the length of the string; and
      appending the string with the determined length; and
   sending the passkey to the user for temporary storage in a computer of the user.

2. The method of claim 1, further comprising prompting a user for the network identification and the password.

3. The method of claim 1, further comprising encrypting the passkey before sending the passkey to the user.

4. The method of claim 1, further comprising:
   sending a redirect request to the computer; and
   determining, based on the redirect request, that the passkey is stored in the computer.

5. The method of claim 1, further comprising redirecting the computer of the user to a web server.

6. The method of claim 1, wherein validating the network identification and the password comprises:
   accessing a user database;
   verifying that the password is not expired; and
   verifying that the password is not suspended.

7. The method of claim 1, wherein sending the passkey to the user for temporary storage in the computer of the user comprises sending the passkey to the user for temporary storage in a cookie file of the computer.

8. The method of claim 7, further comprising:
   sending a redirect request to the computer;
   determining, based on the redirect request, that the cookie file of the computer is turned off;
   prompting the user to turn the cookie file of the computer on; and
   re-sending the passkey to the user for temporary storage in the cookie file of the computer of the user.

9. A network user authentication method, comprising:
   receiving, at a web server, a request from a user;
   determining whether a passkey is present in a cookie file of a computer of the user;
   re-directing the user to an authentication server;
   prompting the user for a network identification and a password;
   receiving, at the authentication server, the network identification and the password;
   validating the network identification and the password;
   generating the passkey for the user, the passkey comprising the network identification, an IP address, a timestamp, a cyclic redundancy check, and a length, generating the passkey for the user comprising:
      temporarily storing the network identification, the IP address, and the timestamp in a buffer as a string of data fields;
      determining the cyclic redundancy check for the string;
      appending the string with the determined cyclic redundancy check;
      determining the length of the string; and
      appending the string with the determined length;
   encrypting the passkey;
   sending the passkey to the user for temporary storage in the cookie file;
   re-directing the user to the web server;
   retrieving, at the web server, the passkey from the cookie file;
   decrypting the passkey;
   validating the passkey; and
   generating a response to the request.

10. The method of claim 9, further comprising determining, after sending the passkey to the user, that the passkey is stored in the cookie file.

11. The method of claim 9, further comprising:
    determining, after sending the passkey to the user, that the cookie file of the computer is turned off;
    prompting the user to turn the cookie file of the computer on; and
    re-sending the passkey to the user for temporary storage in the cookie file.

12. The method of claim 9, wherein validating the network identification and the password comprises:
    accessing a user database;
    verifying that the password is not expired; and
    verifying that the password is not suspended.

13. The method of claim 9, wherein validating the passkey comprises verifying the length and verifying the cyclic redundancy check.

14. The method of claim 9, wherein validating the passkey comprises:
    verifying the length;
    verifying the cyclic redundancy check;
    verifying the network identification;
    verifying the IP address; and
    verifying the timestamp.

15. The method of claim 14, wherein verifying the timestamp comprises:
    determining an elapsed time since the creation of the passkey;
    comparing the time period to an allowable time period; and
    determining the elapsed time is less than the allowable time period.

16. A network user authentication system, comprising:
    an authentication server operable to receive a network identification and a password associated with a user, validate the network identification and the password, generate a passkey for the user, and send the passkey to the user;
    a computer storing the passkey in a cookie file of a memory of the computer for a predetermined time period;
    a web server operable to retrieve the passkey from the cookie file, validate the passkey, and generate a response to the request; and wherein the passkey comprises the network identification, an IP address, a timestamp, a cyclic redundancy check, and a length, the authentication server operable to generate the passkey by:
- temporarily storing the network identification, the IP address, and the timestamp in a buffer as a string of data fields;
- determining the cyclic redundancy check for the string;
- appending the string with the determined cyclic redundancy check;
- determining the length of the string; and
- appending the string with the determined length.

17. The system of claim 16, wherein the authentication server is further operable to prompt a user for the network identification and the password.

18. The system of claim 16, wherein the authentication server is further operable to:
- send a redirect request to the computer; and
- determine, based on the redirect request, that the passkey is stored in the cookie file.

19. The system of claim 16, wherein the authentication server is further operable to:
- send a redirect request to the computer;
- determine, based on the redirect request, that the cookie file of the computer is turned off;
- prompt the user to turn the cookie file of the computer on; and
- re-send the passkey to the user.

20. The system of claim 16, wherein the authentication server is further operable to redirect the computer to the web server.

21. The system of claim 16, wherein the authentication server is further operable:
- access a user database;
- verify that the password is not expired; and
- verify that the password is not suspended.

22. The system of claim 16, wherein the predetermined time period is a length of one session.

23. The system of claim 16, wherein the web server is further operable to decrypt the passkey.

24. The system of claim 16, wherein the web server is further operable to direct the user to the authentication server.

25. The system of claim 16, wherein the web server is further operable to:
- determine that the passkey is absent from the cookie file; and
- redirect the user to the authentication server.

26. The system of claim 16, wherein the web server is further operable to verify the length and verify the cyclic redundancy check.

27. The system of claim 16, wherein the web server is further operable to:
- verify the length;
- verify the cyclic redundancy check;
- verify the network identification;
- verify the IP address; and
- verify the timestamp.

28. The system of claim 27, wherein the web server is further operable to:
- determine a time period that has elapsed since the creation of the passkey;
- compare the time period to an allowable time period; and
- determining that the time period is less than the allowable time period.

29. The system of claim 27, wherein the web server is further operable to:
- determine a time period that has elapsed since the creation of the passkey;
- compare the time period to an allowable time period;
- determine that the time period is greater than the allowable time period.

30. A network user authentication system, comprising:
- means for receiving a network identification and a password associated with a user;
- means for validating the network identification and the password;
- means for generating a passkey for the user, the passkey comprising the network identification, an IP address, a timestamp, a cyclic redundancy check, and a length, generating the passkey for the user comprising:
  - temporarily storing the network identification, the IP address, and the timestamp in a buffer as a string of data fields;
  - determining the cyclic redundancy check for the string;
  - appending the string with the determined cyclic redundancy check;
  - determining the length of the string; and
  - appending the string with the determined length;
- means for sending the passkey to the user;
- memory means for storing the passkey for a predetermined time period;
- means for retrieving the passkey from the memory means;
- means for validating the passkey; and
- means for generating a response to the request.

* * * * *